US012577509B2

(12) United States Patent
Nagato et al.

(10) Patent No.: US 12,577,509 B2
(45) Date of Patent: Mar. 17, 2026

(54) LIQUID ANTIADHESIVE COMPOSITION FOR UNVULCANIZED RUBBER, WATER-DILUTED LIQUID ANTIADHESIVE COMPOSITION SOLUTION FOR UNVULCANIZED RUBBER, AND UNVULCANIZED RUBBER

(71) Applicant: LION SPECIALTY CHEMICALS CO., LTD., Tokyo (JP)

(72) Inventors: Daisuke Nagato, Tokyo (JP); Shiro Sehata, Tokyo (JP)

(73) Assignee: LION SPECIALTY CHEMICALS CO., LTD., Tokyo (JP)

( * ) Notice: Subject to any disclaimer, the term of this patent is extended or adjusted under 35 U.S.C. 154(b) by 288 days.

(21) Appl. No.: 18/455,588

(22) Filed: Aug. 24, 2023

(65) Prior Publication Data

US 2024/0067903 A1 Feb. 29, 2024

(30) Foreign Application Priority Data

Aug. 30, 2022 (JP) ............................ JP2022-137161
Jun. 2, 2023 (JP) ............................ JP2023-091359

(51) Int. Cl.

| | |
|---|---|
| ***C11D 1/00*** | (2006.01) |
| ***C08F 116/06*** | (2006.01) |
| ***C08F 120/06*** | (2006.01) |
| ***C08K 5/098*** | (2006.01) |
| ***C08L 29/04*** | (2006.01) |
| ***C11D 3/22*** | (2006.01) |
| ***C11D 3/37*** | (2006.01) |
| ***C11D 9/00*** | (2006.01) |
| ***C11D 9/02*** | (2006.01) |
| ***C11D 10/04*** | (2006.01) |

(52) U.S. Cl.
CPC ........... *C11D 10/045* (2013.01); *C11D 3/225* (2013.01); *C11D 3/3753* (2013.01); *C11D 3/3761* (2013.01); *C11D 2111/18* (2024.01); *C11D 2111/42* (2024.01)

(58) Field of Classification Search
CPC .. C11D 1/00; C11D 3/22; C11D 3/222; C11D 3/225; C11D 3/3753; C11D 9/00; C11D 9/002; C11D 9/007; C11D 9/02; C11D 10/04; C11D 11/0058; C08L 29/04; C08F 116/06; C08F 120/06; C08K 5/098
See application file for complete search history.

(56) References Cited

U.S. PATENT DOCUMENTS

| | | | | |
|---|---|---|---|---|
| 11,692,092 | B2 * | 7/2023 | Sehata ................ | C09D 129/04 524/43 |
| 2019/0161624 | A1 * | 5/2019 | Moriguchi ............... | C09D 5/00 |
| 2021/0363339 | A1 * | 11/2021 | Sehata .................... | C08L 29/04 |

FOREIGN PATENT DOCUMENTS

| | | |
|---|---|---|
| JP | S50149770 | 12/1975 |
| JP | S6232127 | 2/1987 |
| JP | 2009161667 | 7/2009 |
| JP | 2013001720 | 1/2013 |

* cited by examiner

*Primary Examiner* — Brian P Mruk
(74) *Attorney, Agent, or Firm* — JCIPRNET

(57) ABSTRACT

The disclosure provides a liquid antiadhesive composition for unvulcanized rubber having excellent anti-adhesion properties and an excellent balance between liquid transferability and stability.

The liquid antiadhesive composition for unvulcanized rubber of the disclosure includes: components (A) to (D) below; and water, in which a mass ratio (A)/(D) of the following component (A) to the following component (D) is 5 to 500.

(A): Water-soluble polymer other than component (D)
(B): Metal soap
(C): Surfactant
(D): One or more kinds of compounds selected from water-soluble polymers in which thixotropic index (2 rpm/20 rpm) of 2 mass % aqueous solution at 20° C. is 4.0 or more.

8 Claims, No Drawings

LIQUID ANTIADHESIVE COMPOSITION FOR UNVULCANIZED RUBBER, WATER-DILUTED LIQUID ANTIADHESIVE COMPOSITION SOLUTION FOR UNVULCANIZED RUBBER, AND UNVULCANIZED RUBBER

CROSS-REFERENCE TO RELATED APPLICATION

The disclosure claims priority to Japanese Priority Patent Applications JP 2022-137161 filed in the Japan Patent Office on Aug. 30, 2022, and JP 2023-091359 filed in the Japan Patent Office on Jun. 2, 2023, the entire content of which is hereby incorporated by reference.

BACKGROUND

Technical Field

The disclosure relates to a liquid antiadhesive composition for unvulcanized rubber, a water-diluted liquid antiadhesive composition solution for unvulcanized rubber, and unvulcanized rubber.

Description of Related Art

In rubber production and processing sites, an antiadhesive is applied to the surface of rubber (for example, unvulcanized rubber) to prevent adhesion of the rubber.

As antiadhesives for rubber, those mainly composed of inorganic powder are widely used. These can generally be applied to the surface of rubber after being diluted with water (Patent Documents 1 and 2). In addition, various antiadhesives using water-soluble polymers and the like have been proposed to reduce dust originating from inorganic powder. For example, in Patent Documents 3 and 4, water-soluble polymers (such as sodium alginate, CMC, sodium polyacrylate, and PVA), water-soluble polysaccharides (xanthan gum), and the like are blended together to increase the viscosity of a water-diluted antiadhesive and improve the adhesion of the antiadhesive with respect to the surface of rubber.

PATENT DOCUMENTS

[Patent Document 1] Japanese Patent Laid Open No. S50-149770

[Patent Document 2] Japanese Patent Laid Open No. 2013-001720

[Patent Document 3] Japanese Patent Laid Open No. S62-032127

[Patent Document 4] Japanese Patent Laid Open No. 2009-161667

SUMMARY

To improve the adhesion of an antiadhesive, it is effective to increase the viscosity of a liquid antiadhesive composition for unvulcanized rubber. On the other hand, there is a concern that, if the viscosity is too high, the liquid transferability (handleability) will be affected due to reasons such as a decrease in the fluidity of the liquid antiadhesive composition for unvulcanized rubber.

In addition, there is a concern that, in a case where the amount of water-soluble polymer is reduced to lower the viscosity of the liquid antiadhesive composition for unvulcanized rubber, the stability of the liquid antiadhesive composition for unvulcanized rubber will decrease. In this manner, in the conventional compositions in which a water-soluble polymer and a lubricant such as organic particles are used, there has been a lower likelihood of achieving both the liquid transferability and the stability while maintaining the anti-adhesion properties.

Therefore, the disclosure provides a liquid antiadhesive composition for unvulcanized rubber having excellent anti-adhesion properties and an excellent balance between liquid transferability and stability, a water-diluted liquid antiadhesive composition solution for unvulcanized rubber, and unvulcanized rubber.

According to an embodiment, a liquid antiadhesive composition for unvulcanized rubber of the disclosure includes: components (A) to (D) below; and water, in which a mass ratio (A)/(D) of the following component (A) to the following component (D) is 5 to 500.

(A): Water-soluble polymer other than component (D)

(B): Metal soap (C): Surfactant (D): One or more kinds of compounds selected from water-soluble polymers in which thixotropic index (2 rpm/20 rpm) of 2 mass % aqueous solution at 20° C. is 4.0 or more According to an embodiment, a water-diluted liquid antiadhesive composition solution for unvulcanized rubber of the disclosure includes: the liquid antiadhesive composition for unvulcanized rubber of the disclosure; and water.

According to an embodiment, unvulcanized rubber includes: the components (A) to (D) of the liquid antiadhesive composition for unvulcanized rubber of the disclosure adhering to its surface.

According to the disclosure, it is possible to provide a liquid antiadhesive composition for unvulcanized rubber having excellent anti-adhesion properties and an excellent balance between liquid transferability and stability, a water-diluted liquid antiadhesive composition solution for unvulcanized rubber, and unvulcanized rubber.

DESCRIPTION OF THE EMBODIMENTS

Hereinafter, the disclosure will be described more specifically with reference to examples. However, the disclosure is not limited to the following description.

A liquid antiadhesive composition for unvulcanized rubber of the disclosure may contain, for example, 20 mass % or more of the component (A), 20 to 60 mass % of the component (B), 10 to 25 mass % of the component (C), and 0.01 to 10 mass % of the component (D) based on 100 mass % of all the components other than water. Accordingly, a liquid antiadhesive for unvulcanized rubber having, for example, not only an excellent balance among anti-adhesion properties, liquid transferability, and stability but also having an excellent balance between anti-foaming properties and costs is obtained.

In the liquid antiadhesive composition for unvulcanized rubber of the disclosure, a mass ratio (A)/(B) of the component (A) to the component (B) may be within a range of 0.2 to 4.0, for example. Accordingly, a liquid antiadhesive for unvulcanized rubber having, for example, not only an excellent balance among anti-adhesion properties, liquid transferability, and stability but also having an excellent balance with scattering properties is obtained.

An anti-adhesion treatment method for unvulcanized rubber of the disclosure may be one including, for example, a step of making the components (A) to (D) of the liquid antiadhesive composition for unvulcanized rubber of the disclosure adhere to the surface of the unvulcanized rubber to perform an anti-adhesion treatment. The anti-adhesion treatment step may be, for example, a step of making the liquid antiadhesive composition for unvulcanized rubber of the disclosure or the water-diluted liquid antiadhesive composition solution for unvulcanized rubber of the disclosure adhere to the surface of the unvulcanized rubber and making the components (A) to (D) of the liquid antiadhesive composition for unvulcanized rubber of the disclosure adhere to the surface of the unvulcanized rubber through volatilizing water. More specifically, the anti-adhesion treatment step may include, for example: a step of making the liquid antiadhesive composition for unvulcanized rubber of the disclosure adhere to the surface of the unvulcanized rubber; and a step of drying the liquid antiadhesive composition for unvulcanized rubber on the surface of the unvulcanized rubber to form a coating film on the surface of the unvulcanized rubber.

Hereinafter, specific examples of the disclosure will be described in more detail.

[1. Liquid Antiadhesive Composition for Unvulcanized Rubber]

As described above, the liquid antiadhesive composition for unvulcanized rubber of the disclosure includes: components (A) to (D) below; and water, in which a mass ratio (A)/(D) of the following component (A) to the following component (D) is 5 to 500.

(A): Water-soluble polymer other than component (D)
(B): Metal soap
(C): Surfactant
(D): One or more kinds of compounds selected from water-soluble polymers in which thixotropic index (2 rpm/20 rpm) of 2 mass % aqueous solution at 20° C. is 4.0 or more The liquid antiadhesive composition for unvulcanized rubber of the disclosure having the above-described composition has excellent anti-adhesion properties and an excellent balance between liquid transferability and stability.

Hereinafter, each component of the liquid antiadhesive composition for unvulcanized rubber of the disclosure will be described.

[1-1. Component (A): Water-Soluble Polymer Other than Component (D)]

The component (A) is, as described above, a water-soluble polymer other than the component (D). In the liquid antiadhesive composition for unvulcanized rubber of the disclosure, the component (A), that is, a water-soluble polymer other than the component (D) (hereinafter sometimes referred to as a "water-soluble polymer (A)") is a polymer compound that can be dispersed or dissolved in the liquid antiadhesive composition for unvulcanized rubber by being placed in water or being heated after being placed in water. Accordingly, for example, an effect of covering unvulcanized rubber is obtained, and an anti-adhesion effect is obtained. In this manner, the component (A) acts as, for example, a film-forming agent. In addition, anti-adhesion properties are exhibited using, for example, the component (A) and the component (B) in combination.

In the liquid antiadhesive composition for unvulcanized rubber of the disclosure, the content of the water-soluble polymer (A) is not particularly limited. However, the lower limit thereof based on the total mass of components (solid contents) other than water may be 20 mass % or more, for example, 25 mass % or more, 30 mass % or more, 40 mass % or more, or 50 mass % or more, and the upper limit thereof may be, for example, 70 mass % or less, 60 mass % or less, 40 mass % or less, or 35 mass % or less. When the content of the water-soluble polymer (A) based on the total mass of the components other than water is 20 mass % or more, for example, an excellent effect of forming a film on unvulcanized rubber is obtained. In addition, when the content of the water-soluble polymer (A) in the liquid antiadhesive composition for unvulcanized rubber of the disclosure based on the total mass of the components other than water is 70 mass % or less, for example, excellent drying properties are obtained, and therefore, the composition can be dried quickly.

The content (formulation amount) of the component (A) in the liquid antiadhesive composition for unvulcanized rubber of the disclosure is not particularly limited but may be, for example, based on the total mass of the liquid antiadhesive composition for unvulcanized rubber of the disclosure, 1 to 20 mass %, 2 to 20 mass %, 3 to 20 mass %, 4 to 18 mass %, or 5 to 16 mass %. To prevent worsening of handleability due to an excessive increase in viscosity of the liquid antiadhesive composition for unvulcanized rubber of the disclosure, the content of the component (A) is preferably 20 mass % or less based on the total mass of the liquid antiadhesive composition for unvulcanized rubber of the disclosure.

The water-soluble polymer (A) may be, for example, a water-soluble polymer in which the viscosity of a 2 mass % aqueous solution at 25° C. is 3 to 300 m·Pas. When the viscosity of the 2 mass % aqueous solution at 25° C. in the water-soluble polymer is 3 m·Pas or more, an effect that, for example, the deposition amount on unvulcanized rubber improves is obtained. When the viscosity of the 2 mass % aqueous solution in the water-soluble polymer is 300 m·Pas or less, an effect that, for example, drying properties are excellent is obtained. The viscosity of the 2 mass % aqueous solution may be, for example, 10 m·Pas or more or 100 m·Pas or more, or may be 200 m·Pas or less or 100 m·Pas or less.

The water-soluble polymer (A) is not particularly limited but may be, for example, a polymer having a lower limit of solubility in 100 g of water at 25° C. of 1 g or more, 10 g or more, or 50 g or more. In addition, in the disclosure, the "polymer" is not particularly limited, but the lower limit of the mass average molecular weight may be, for example, 1,000 or more, 5,000 or more, or 10,000 or more. The upper limit of the mass average molecular weight is not particularly limited but may be, for example, 500,000 or less.

The type of water-soluble polymer (A) is not particularly limited, and only one type may be used or multiple types may be used in combination. The water-soluble polymer (A) may be, for example, a synthetic water-soluble polymer or a natural water-soluble polymer. The "synthetic water-soluble polymer" may be, for example, an artificially synthesized polymer with a chemical structure that does not exist in nature or an artificially synthesized polymer with a chemical structure that exists in nature. In addition, the "natural water-soluble polymer" may be, for example, a polymer which is extracted or produced from nature and has a chemical structure that exists in nature. The synthetic water-soluble polymer is not particularly limited, but examples thereof include carboxymethyl cellulose (CMC), polyacrylic acid, sodium polyacrylate, polyacrylamide, polyvinyl alcohol (PVA), polyvinyl pyrrolidone, polyethylene glycol, polyethylene oxide, methyl cellulose, hydroxyethyl cellulose, hydroxyethyl methyl cellulose, hydroxypropyl methyl cellulose, water-soluble urethane resins, water-soluble melamine resins, water-soluble epoxy resins, water-soluble butadiene resins, and water-soluble phenolic resins. The natural water-soluble polymer is not particularly limited, but examples thereof include proteins, welan gum, tamarind gum, tamarind seed gum, tragacanth gum, gum arabic, carrageenan, rhamsan gum, succinoglycan, tara gum, karaya gum, pectin, alginic acid derivatives, and cellulose ethers.

The component (A) is preferably at least one selected from the group consisting of polyvinyl alcohol, CMC, polyacrylic acid, sodium polyacrylate, methyl cellulose, hydroxyethyl cellulose, hydroxyethyl methyl cellulose, and hydroxypropyl methyl cellulose and is more preferably at least one of methyl cellulose or hydroxypropyl methyl cellulose. From the viewpoint of improving the deposition amount of the liquid antiadhesive composition for unvulcanized rubber of the disclosure on unvulcanized rubber, it is preferable that the viscosity of the component (A) not be too low. From the viewpoint of improving the drying properties of the liquid antiadhesive composition for unvulcanized rubber of the disclosure, it is preferable that the viscosity of the component (A) not be too high. In the disclosure, the "deposition amount" of the liquid antiadhesive composition for unvulcanized rubber refers to a deposition amount of all components of the liquid antiadhesive composition for unvulcanized rubber other than water on the surface of the unvulcanized rubber.

[1-2. Component (B): Metal Soap]

In the liquid antiadhesive composition for unvulcanized rubber of the disclosure, the component (B) is, as described above, a metal soap. The metal soap (B) is, for example, a metal salt of a higher fatty acid or a derivative thereof other than a sodium salt and a potassium salt. Examples thereof include a metal salt other than an alkali metal salt excluding a lithium salt. The metal soap (B) is a lubricant, and the better the dispersion with the component (A), the better the anti-adhesion properties.

As described above, the metal soap (B) is, for example, a metal salt of a higher fatty acid or a derivative thereof other than a sodium salt and a potassium salt. Examples thereof include a metal salt other than an alkali metal salt excluding a lithium salt. Examples thereof include a calcium salt, a magnesium salt, a zinc salt, an aluminum salt, a lithium salt, and a barium salt. A higher fatty acid is, for example, a fatty acid having 8 or more, 12 or more, or 14 or more carbon atoms. The upper limit value of the number of carbon atoms is not particularly limited but is, for example, 22 or less, 20 or less, or 18 or less carbon atoms. A higher fatty acid derivative may be, for example, a higher fatty acid substituted with one or more substituents. Specific examples of the metal soap (B) include calcium caprylate, lithium caprylate, zinc caprylate, magnesium caprylate, calcium caprate, lithium caprate, zinc caprate, magnesium caprate, calcium laurate, lithium laurate, zinc laurate, magnesium laurate, aluminum laurate, calcium myristate, lithium myristate, zinc myristate, magnesium myristate, calcium palmitate, lithium palmitate, zinc palmitate, magnesium palmitate, calcium stearate, lithium stearate, zinc stearate, magnesium stearate, aluminum stearate, aluminum trioctadecanoate, aluminum dioctadecanoate, aluminum monooctadecanoate, calcium octadecanoate, lithium octadecanoate, zinc octadecanoate, magnesium octadecanoate, calcium oleate, lithium oleate, zinc oleate, magnesium oleate, calcium behenate, lithium behenate, zinc behenate, magnesium behenate, calcium 12-hydroxystearate, lithium 12-hydroxystearate, zinc 12-hydroxystearate, magnesium 12-hydroxystearate, calcium 14-octadecanoate, lithium 14-octadecanoate, zinc 14-octadecanoate, magnesium 14-octadecanoate, calcium 8-octadecanoate, lithium 8-octadecanoate, zinc 8-octadecanoate, magnesium 8-octadecanoate, calcium 6-octadecanoate, lithium 6-octadecanoate, zinc 6-octadecanoate, magnesium 6-octadecanoate, calcium cocoate, lithium cocoate, zinc cocoate, magnesium cocoate, calcium palmate, lithium palmate, zinc palmate, magnesium palmate, palm kernel oil fatty acid calcium, palm kernel oil fatty acid lithium, palm kernel oil fatty acid zinc, palm kernel oil fatty acid magnesium, calcium tallowate, lithium tallowate, zinc tallowate, magnesium tallowate, castor oil fatty acid calcium, castor oil fatty acid lithium, castor oil fatty acid zinc, and castor oil fatty acid magnesium.

The metal soap (B) is preferably a divalent metal salt of a fatty acid having an average carbon chain length of 12 to 22, more preferably a divalent metal salt of a higher fatty acid having 14 to 20 or 16 to 18 carbon atoms. In addition, the metal soap (B) is preferably a calcium salt, a magnesium salt, or a zinc salt. A fatty acid may be a saturated fatty acid or an unsaturated fatty acid, but is preferably a saturated fatty acid. Among these, calcium stearate, magnesium stearate, and zinc stearate are preferable from the viewpoint that they are readily available in large quantities and at low cost.

The content (formulation amount) of the metal soap (B) is not particularly limited but is, for example, 1 to 20 mass %, 2 to 20 mass %, or 3 to 18 mass % based on the total mass of the liquid antiadhesive composition for unvulcanized rubber of the disclosure, and is, for example, 20 to 60 mass % based on the total mass of all components (solid contents) other than water. The mass of the metal soap (B) is preferably 20 mass % or more based on the total mass of all components other than water from the viewpoint of lubricity of an anti-adhesion film and is more preferably 60 mass % or less from the viewpoints of suppressing powder scattering of the liquid antiadhesive composition for unvulcanized rubber and suppressing deterioration in handleability due to high viscosity. The content (formulation amount) of the metal soap (B) may be, based on the total mass of all components (solid contents) other than water, for example, 25 mass % or more or 30 mass % or more, or may be, for example, 50 mass % or less, 45 mass % or less, or 40 mass % or less.

In addition, the mass ratio (A)/(B) of the component (A) to the metal soap (B) is not particularly limited but may be, for example, within a range of 0.2 to 4.0 as described above. If the mass ratio is 0.2 or more, the powder scattering of the liquid antiadhesive composition for unvulcanized rubber is likely to be suppressed, and if the mass ratio is 4.0 or less, an effect of improving anti-adhesion properties by mixing and dispersing the component (A) and the metal soap (B) is likely to be obtained. The lower limit value of the mass ratio (A)/(B) is more preferably 0.3 or more or 0.5 or more, and the upper limit value thereof is more preferably 4.0 or less or 3.0 or less.

[1-3. Component (C): Surfactant]

The content of the component (C), that is, a surfactant (hereinafter sometimes referred to as a "surfactant (C)") in the liquid antiadhesive composition for unvulcanized rubber of the disclosure is not particularly limited but is, for example, 1 to 10 mass % or 2 to 8 mass % based on the total mass of the liquid antiadhesive composition for unvulcanized rubber of the disclosure, and is, for example, 10 to 25 mass % based on the total mass of all components (solid contents) other than water. If the content of the surfactant (C) is 10 mass % or more based on the total mass of the components other than water, for example, the metal soap (B) has an improved dispersion effect and becomes difficult to separate, and if the content thereof is 25 mass % or less, for example, the dispersibility is moderately suppressed, the adhesion becomes favorable, and the anti-adhesion properties become favorable. The content of the surfactant (C) may be, based on the total mass of components other than water, for example, 10 mass % or more or 12 mass % or more, or may be, for example, 20 mass % or less, 18 mass % or less, or 16 mass % or less. The method for measuring adhesion with respect to unvulcanized rubber is not particularly limited but the measurement can be performed through, for example, a measurement method described in examples to be described below.

The surfactant (C), for example, imparts dispersibility in water to the liquid antiadhesive composition for unvulcanized rubber of the disclosure and improves wettability, thereby improving adhesion with respect to unvulcanized rubber. The surfactant (C) is not particularly limited, only one type may be used or multiple types may be used in combination. For example, at least one of an anionic surfactant or a nonionic surfactant may be used. The anionic surfactant is not particularly limited, but examples thereof include (i) to (iv) below. In addition, the nonionic surfactant is not particularly limited, but examples thereof include (v) below.

(i) Carboxylic acid type anionic surfactants such as higher fatty acid salt, alkyl (or alkenyl) ether carboxylate, polyoxyalkylene ether carboxylate, alkyl (or alkenyl) amide ether carboxylate, and acylaminocarboxylate (ii) Sulfate type anionic surfactants such as higher alcohol sulfonic ester salt, polyoxyalkylene higher alcohol sulfonic ester salt, alkyl phenyl ether sulfuric ester salt, polyoxyalkylene alkyl phenyl ether sulfuric ester salt, and glycerol fatty acid ester monosulfuric ester salt (iii) Sulfonic acid type anionic surfactants such as alkanesulfonate, α-olefin sulfonate, linear alkylbenzene sulfonate, α-sulfofatty acid ester salt, and dialkyl sulfosuccinate (iv) Phosphoric ester type anionic surfactants such as alkyl phosphoric ester salt, polyoxyalkylene alkyl phosphoric ester salt, polyoxyalkylene alkyl phenyl phosphoric ester salt, and glycerin fatty acid ester monophosphoric ester salt (v) Polyoxyalkylene alkyl ether type nonionic surfactants The counter ion of the anionic surfactant is not particularly limited but is preferably alkali metals such as sodium and potassium and alkanolamines such as monoethanolamine and diethanolamine. These may be used alone or in combination of multiple types.

As the anionic surfactant, dialkyl sulfosuccinate is preferable and dioctyl sulfosuccinate Na salt is more preferable since an antiadhesive composition having superior wettability with respect to the surface of unvulcanized rubber is obtained.

The nonionic surfactant is not particularly limited, but in the disclosure, for example, a nonionic surfactant represented by Formula (1) below can be used. It is inferred that, together with the anionic surfactant, the nonionic surfactant of Formula (1) below would reduce surface tension of an antiadhesive composition with respect to the surface of unvulcanized rubber and would have an action of effectively enhancing adhesion of the antiadhesive composition with respect to the surface of unvulcanized rubber. However, this inference does not limit the disclosure.

$$RO\text{-}(AO)_n\text{—}H \qquad (1)$$

In Formula (1) above, R represents a C8-18 aliphatic hydrocarbon group. The aliphatic hydrocarbon group may be linear or branched. In addition, it may be either saturated or unsaturated. The number of carbons in R is preferably 12 to 16 and more preferably 12 to 13 from the viewpoint of excellent dispersibility of the component (A). AO represents a C2-4 oxyalkylene group, and n is an average addition molar number of AO. n is, for example, 1 to 30, 1 to 25, or 2 to 15. Specifically, n is 1 or more (that is, not 0) from the viewpoint of preventing deterioration in surface activity and deterioration in dispersibility of the component (A). In addition, n is 30 or less or 25 or less from the viewpoint of preventing deterioration in adhesion due to excessively high hydrophilicity. It is inferred that, if n is within a range of 1 to 30 or a range of 1 to 25, the dispersibility of the component (A) would be further improved, and even in a case where the hydrophobicity of the surface of unvulcanized rubber is high, sufficient viscoelasticity would be imparted to a dry coating of a liquid antiadhesive composition for unvulcanized rubber, whereby the adhesion is improved. However, this inference does not limit the disclosure.

The C2-4 oxyalkylene group is, for example, a polymerization unit obtained by addition of a C2-4 alkylene oxide (formed through addition polymerization). Specific examples of C2-4 oxyalkylene groups include an oxyethylene group (EO) obtained by addition of ethylene oxide, an oxypropylene group (PO) obtained by addition of propylene oxide, and an oxybutylene group (BO) obtained by addition of butylene oxide. $(AO)_n$ contains at least an oxyethylene group in its structure. In a case where $(AO)_n$ contains plural kinds among an oxyethylene group (EO), an oxypropylene group (PO), and an oxybutylene group (BO), these groups may be arranged in blocks or randomly. Preferred $(AO)_n$ consists of an oxyethylene group (EO) from the viewpoint of excellent balance between hydrophilicity and hydrophobicity.

Specific examples of nonionic surfactants are not particularly limited but include lauryl ether EO, cetyl ether EO, stearyl ether EO, oleyl ether EO, decyl ether EO, isodecyl ether EO, tridecyl ether EO, secondary alcohol ether EO, synthetic alcohol ether EOPO, lauryl ether EOPO, decyl ether EOPO, isodecyl ether EOPO, tridecyl ether EOPO, and stearyl ether EOPO.

[1-4. Component (D)]

The component (D) is, as described above, one or more kinds of compounds selected from water-soluble polymers in which a thixotropic index (2 rpm/20 rpm) (hereinafter sometimes simply referred to as a "TI value") of a 2 mass % aqueous solution at 20° C. is 4.0 or more. The TI value can be measured, for example, as follows. 2 g of a water-soluble polymer is added to 98 g of water, mixed at 80° C. for 30 minutes to dissolve completely, and then cooled to a temperature to be measured. Thereafter, the viscosity of the prepared aqueous solution was measured with a BH viscometer by setting the rotational speed to 2 rpm and 20 rpm. Each obtained viscosity value is determined using the following equation (viscosity value obtained at 2 rpm/viscosity value obtained at 20 rpm). The TI value is not particularly limited but may be, for example, 4.0 or more or 6.0 or more, or may be, for example, 15.0 or less, 12.0 or less, 10.0 or less, or 8.0 or less. Accordingly, for example, an effect of stabilizing the liquid antiadhesive composition for unvulcanized rubber of the disclosure is obtained. In this manner, the component (D) acts as, for example, a stabilizer.

The content of the component (D) is not particularly limited but may be, for example, 0.01 to 0.8 mass %, 0.03 to 0.6 mass %, or 0.05 to 0.5 mass % based on the total mass of the liquid antiadhesive composition for unvulcanized rubber of the disclosure, and may be, for example, 0.01 to 10 mass % based on the total mass of all components (solid contents) other than water. When the content of the component (D) is 0.01 mass % or more based on the total mass of the components other than water, for example, the liquid antiadhesive composition for unvulcanized rubber of the disclosure becomes difficult to separate, and when the content thereof is 10 mass % or less, for example, worsening of handleability due to an excessive increase in viscosity of the liquid antiadhesive composition for unvulcanized rubber of the disclosure can be prevented. The content of the component (D) may be, based on the total mass of components other than water, for example, 0.1 mass % or more or 0.5 mass % or more, or may be, for example, 8.0 mass % or less or 4.0 mass % or less.

The component (D) may be, for example, a water-soluble polymer in which the viscosity of a 2 mass % aqueous solution at 25° C. is 3 to 300 m·Pas. When the viscosity of the 2 mass % aqueous solution at 25° C. in the water-soluble polymer is 3 m·Pas or more, an effect that, for example, the deposition amount on unvulcanized rubber improves is obtained. When the viscosity of the 2 mass % aqueous solution in the water-soluble polymer is 300 m·Pas or less, an effect that, for example, drying properties are excellent is obtained. The viscosity of the 2 mass % aqueous solution may be, for example, 10 m·Pas or more or 100 m·Pas or more, or may be 200 m·Pas or less or 100 m·Pas or less.

The component (D) is not particularly limited but may be, for example, a polymer having a lower limit of solubility in 100 g of water at 25° C. of 1 g or more, 10 g or more, or 50 g or more.

The type of the component (D) is not particularly limited, and only one type may be used or multiple types may be used in combination. The component (D) may be, for example, a synthetic water-soluble polymer or a natural water-soluble polymer. The "synthetic water-soluble polymer" is, for example, the same as that described for the component (A). In addition, the "natural water-soluble polymer" is, for example, the same as that described for the component (A).

The component (D) is preferably at least one selected from the group consisting of diutan gum, xanthan gum, guar gum, locust bean gum, and gellan gum having a TI value of 4.0 or more.

In addition, the mass ratio (A)/(D) of the component (A) to the component (D) is within a range of 5 to 500 as described above. If the mass ratio is 5 or more, favorable fluidity (handleability) can be ensured, and if the mass ratio is 500 or less, favorable stability is obtained. The lower limit value of the mass ratio (A)/(D) of the component (A) to the component (D) is preferably 5 or more, 8 or more, or 10 or more, and the upper limit value thereof is preferably 400 or less, 200 or less, or 100 or less.

[1-5. Water]

In the liquid antiadhesive composition for unvulcanized rubber of the disclosure, the content of water is not particularly limited, but may be, based on the total mass of the liquid antiadhesive composition for unvulcanized rubber, for example, 50 mass % or more, 60 mass % or more, or 70 mass % or more, or may be, for example, 95 mass % or less, 90 mass % or less, 85 mass % or less, or 80 mass % or less.

Water functions to, for example, impart fluidity to the liquid antiadhesive composition for unvulcanized rubber of the disclosure making it easy to handle. In addition, water is not particularly limited but may be, for example, tap water, distilled water, or ion-exchanged water.

[1-5. Optional Components, Etc.]

The liquid antiadhesive composition for unvulcanized rubber of the disclosure may or may not contain optional components other than water and the components (A) to (D). For example, the liquid antiadhesive composition for unvulcanized rubber of the disclosure may contain, as necessary, additives such as a defoaming agent, a preservative, a wettability aid, a viscosity aid, and a foreign matter reduction aid as optional components.

The defoaming agent is not particularly limited, but examples thereof include: oil- and fat-based defoaming agents such as castor oil, sesame oil, linseed oil, and animal and vegetable oils; fatty acid ester-based defoaming agents such as isoamyl stearate, distearyl succinate, ethylene glycol distearate, and butyl stearate; alcohol-based defoaming agents such as polyoxyalkylene monohydric alcohol, di-t-amyl phenoxyethanol, 3-heptanol, and 2-ethylhexanol; ether-based defoaming agents such as di-t-aminophenoxyethanol, 3-heptyl cellosolve, nonyl cellosolve, and 3-heptylcarbitol; phosphoric ester-based defoaming agents such as tributyl phosphate and tris(butoxyethyl) phosphate; amine-based defoaming agents such as diamylamine; amide-based defoaming agents such as polyalkyleneamide and acylate polyamine; mineral oils' and silicone oils. The defoaming agents may be used alone or in combination of multiple types.

The preservative is not particularly limited, but examples thereof include derivatives of isothiazolinone, pyridine, and iodine. The isothiazolinone derivative is not particularly limited, but examples thereof include benzisothiazolinone (BIT), methylisothiazolinone (MIT, MI), chloromethylisothiazolinone (CMIT, CMI), octylisothiazolinone (OIT, OI), dichlorooctylisothiazolinone (DCOIT, DCOI), and derivatives thereof. The pyridine derivative is not particularly limited, but examples thereof include pyridinethiol and derivatives thereof. The iodine derivative is not particularly limited, but examples thereof include iodo-2-propargylbutylcarbamic acid and derivatives thereof. For example, the preservatives may be used alone or in combination of multiple types.

The wettability aid is not particularly limited, but examples thereof include alcohols, and more specific examples thereof include methanol, ethanol, hexanol, glycerol, 1,3-butanediol, propylene glycol, dipropylene glycol, pentylene glycol, hexylene glycol, polyethylene glycol, sorbitol, maltitol, sucrose, erythritol, xylitol, polypropylene glycol, and adducts of ethylene oxide or propylene oxide of polyhydric alcohols. The wettability aids may be used alone or in combination of multiple types.

The viscosity of the liquid antiadhesive composition for unvulcanized rubber of the disclosure is not particularly limited but is, for example, as viscosity measured with a BH-type viscometer at 25° C. and 20 rpm after 10 rotations after 3 days of production of a liquid antiadhesive composition for unvulcanized rubber, preferably 25,000 m·Pas, more preferably 1,000 to 25,000 m·Pas, still more preferably 2,000 to 25,000 m·Pas, and particularly preferably 3,000 to 24,000 m·Pas in that the composition becomes difficult to separate and the handleability (handling) is favorable. The viscosity of the liquid antiadhesive composition for unvulcanized rubber is preferably not too low from the viewpoint of suppressing or preventing the separation of the liquid antiadhesive composition for unvulcanized rubber and is preferably not too high from the viewpoint of suppressing or preventing deterioration in handling, such as difficulty in coming out of a container.

[2. Method for Producing Liquid Antiadhesive Composition for Unvulcanized Rubber]

The method for producing a liquid antiadhesive composition for unvulcanized rubber of the disclosure is not particularly limited, but the production can be performed, for example, by mixing all components (the components (A) to (D) and water, and optional components blended as necessary) of the liquid antiadhesive composition for unvulcanized rubber. There are no particular restrictions on the order of mixing and the devices, facilities, and the like used for mixing. Examples thereof include a method of mixing water, water-soluble polymers (the components (A) and (D)), and a surfactant (the component (C)) with each other, and then mixing the mixture with a metal soap (the component (B)) and other optional components. The devices used for mixing is not particularly limited as described above, but for example, a device having a configuration in which a stirring blade is provided in a container can be used. Specific examples thereof include general liquid mixers and liquid mixers such as a vortex mixer, a static mixer, a homogenizer, and a line homomixer.

[3. Method of Using Liquid Antiadhesive Composition for Unvulcanized Rubber, Etc.]

The method of using a liquid antiadhesive composition for unvulcanized rubber of the disclosure is not particularly limited but may be, for example, the same as or similar to a general method of using a liquid antiadhesive composition for unvulcanized rubber. The method of using a liquid antiadhesive composition for unvulcanized rubber of the disclosure is specifically, for example, as follows, but is not limited thereto.

An anti-adhesion treatment method for unvulcanized rubber in which the liquid antiadhesive composition for unvulcanized rubber of the disclosure is used may have, for example, a step of making the components (A) to (D) of the liquid antiadhesive composition for unvulcanized rubber of the disclosure adhere to the surface of the unvulcanized rubber to perform an anti-adhesion treatment as described above. Adhesion to the surface of the unvulcanized rubber can be performed through, for example, a wet method described below. The anti-adhesion-treated unvulcanized rubber pieces which have been subjected to anti-adhesion treatment in this manner do not adhere closely to each other even if these are, for example, stacked or folded during storage. In addition, such an anti-adhesion treatment method for unvulcanized rubber can also be said to be a method for producing anti-adhesion-treated unvulcanized rubber.

The liquid antiadhesive composition for unvulcanized rubber of the disclosure may be used as it is, or may be used in the form of a water-diluted solution (for example, an aqueous dispersion or an aqueous solution) by being diluted with water. The water-diluted liquid antiadhesive composition solution for unvulcanized rubber of the disclosure may be, for example, an aqueous dispersion of a liquid antiadhesive composition for unvulcanized rubber or an aqueous solution of a liquid antiadhesive composition for unvulcanized rubber. In the liquid antiadhesive composition for unvulcanized rubber of the disclosure, concentration of the composition when the composition adheres to the surface of unvulcanized rubber is not particularly limited, but the total mass of components other than water based on the total mass of the liquid antiadhesive composition for unvulcanized rubber may be, for example, 0.5 mass % or more, 1 mass % or more, or 2 mass % or more, or may be, for example, 15 mass % or less, 10 mass % or less, or 5 mass % or less. If the concentration thereof is not too high, for example, effects such as low scattering properties and fast drying are obtained. If the concentration thereof is not too low, for example, effects such as high anti-adhesion properties and high lubricity are obtained. Since the liquid antiadhesive composition for unvulcanized rubber of the disclosure can exhibit high anti-adhesion properties even if the concentration thereof when the composition adheres to the surface of the unvulcanized rubber is low, the high anti-adhesion properties can be exhibited with a small deposition amount. In addition, the viscosity of the composition when the composition adheres to the surface of the unvulcanized rubber is not particularly limited but may be, for example, 1 m·Pas or more, 5 m·Pas or more, or 10 m·Pas or more, or may be, for example, 30 m·Pas or less, 20 m·Pas or less, or 15 m·Pas or less. If the viscosity thereof is not too high, for example, effects such as low scattering properties and fast drying are obtained. If the viscosity thereof is not too low, for example, effects such as high anti-adhesion properties and high lubricity are obtained.

The anti-adhesion treatment step may be, for example, as described above, a step of making the liquid antiadhesive composition for unvulcanized rubber of the disclosure or the water-diluted liquid antiadhesive composition solution for unvulcanized rubber of the disclosure adhere to the surface of the unvulcanized rubber and making the components (A) to (D) of the liquid antiadhesive composition for unvulcanized rubber of the disclosure adhere to the surface of the unvulcanized rubber through volatilizing water. More specifically, the anti-adhesion treatment step may include, for example: a step of making the liquid antiadhesive composition for unvulcanized rubber of the disclosure adhere to the surface of the unvulcanized rubber; and a step of drying the liquid antiadhesive composition for unvulcanized rubber on the surface of the unvulcanized rubber to form a coating film on the surface of the unvulcanized rubber. Such an anti-adhesion treatment step is referred to as, for example, a wet method. The wet method is not particularly limited, and for example, it can be carried out in the same manner as a general wet method for a liquid antiadhesive composition for unvulcanized rubber.

In the adhering step of a liquid antiadhesive composition for unvulcanized rubber, the liquid antiadhesive composition for unvulcanized rubber is preferably made to adhere to the unvulcanized rubber which is at a high temperature (for example, about 80° C. to 150° C.) due to heat generated when, for example, the unvulcanized rubber is molded into a sheet shape.

Specific examples of the method for the adhering step of a liquid antiadhesive composition for unvulcanized rubber include a method of spraying a liquid antiadhesive composition for unvulcanized rubber on unvulcanized rubber with a shower device and a dipping method in which unvulcanized rubber is immersed for a short period of time in a tank containing a liquid antiadhesive composition for unvulcanized rubber. In addition, a method for applying a liquid antiadhesive composition for unvulcanized rubber to unvulcanized rubber using an applicator, etc. may be employed, and these methods may be appropriately used in combination.

The liquid antiadhesive composition for unvulcanized rubber of the disclosure has, as described above, excellent anti-adhesion properties and an excellent balance between liquid transferability and stability.

The type of rubber to which the liquid antiadhesive composition for unvulcanized rubber of the disclosure is applicable is not particularly limited, and unvulcanized rubber may be used. Examples of the types of rubber include rubber such as natural rubber (NR), butadiene rubber (BR), styrene butadiene rubber (SBR), butyl rubber (IIR), and ethylene propylene rubber (EPDM), and rubber in which plural kinds of these rubber pieces are mixed.

EXAMPLES

Next, examples of the disclosure will be described. However, the disclosure is not limited to the following examples.

Example 1

A liquid antiadhesive composition for unvulcanized rubber of Example 1 was produced as follows.

903.5 g of water was placed in a reaction container and heated to 80° C. or higher. Thereafter, 40 g of hydroxypropyl methyl cellulose (Metolose 60SH-4000, substitution degree of methoxy group of 1.9, number of moles of substituted hydroxypropoxy group of 0.25, 2% viscosity of 4,000 m·Pas, manufactured by Shin-Etsu Chemical Co., Ltd.) and 0.5 g of gellan gum (Kelcogel AFT manufactured by Sansho Co., Ltd. (TI value=6.4)) were placed in the reaction container and mixed for 2 hours. The hydroxypropyl methyl cellulose is a water-soluble polymer and corresponds to the component (A) in the liquid antiadhesive composition for unvulcanized rubber of the disclosure. The gellan gum corresponds to the component (D) in the liquid antiadhesive composition for unvulcanized rubber of the disclosure. After a mixture obtained by mixing for 2 hours in this manner is cooled to 30° C. or lower, 40 g of calcium laurate (manufactured by Taihei Chemical Industrial Co., Ltd.), 10 g of a coconut alcohol EO adduct (LEOX (registered trademark) CC-150 manufactured by Lion Specialty Chemicals Co., Ltd.), 5 g of sodium alpha-olefin sulfonate (LIPOLAN (registered trademark) LB-840 manufactured by Lion Specialty Chemicals Co., Ltd.), and 1 g of a preservative (Slaoff EX manufactured by Osaka Gas Chemicals Co., Ltd.) were further added thereto to obtain a liquid antiadhesive composition for unvulcanized rubber. The calcium laurate is a metal soap and corresponds to the component (B) in the liquid antiadhesive composition for unvulcanized rubber of the disclosure. Both the coconut alcohol EO adduct and the sodium alpha-olefin sulfonate are surfactants and correspond to the component (C) in the liquid antiadhesive composition for unvulcanized rubber of the disclosure. The preservative corresponds to an optional component other than the components (A) to (D).

Examples 2 to 33 and Comparative Examples 1 to 6

Liquid antiadhesive compositions for unvulcanized rubber of Examples 2 to 33 and Comparative Examples 1 to 6 were produced in the same manner as in Example 1 except that the type and composition of a raw material was changed as shown in Tables 2 to 5. Trade names (product names), manufacturers, and characteristics (compositions) of the raw materials used for producing the liquid antiadhesive compositions for unvulcanized rubber of Examples 2 to 33 and Comparative Examples 1 to 6 are shown in Table 1 below.

TABLE 1

| Component | Component | Product name | Manufacturer | Remarks (Units for viscosity are all “mPa · s”) |
|---|---|---|---|---|
| Component (A) | Carboxymethyl cellulose | CMC Daicel 1220 | Daicel FineChem Ltd. | Etherification degree of 0.8 to 1.0, 1% viscosity of 10 to 20 |
| | Water-soluble acrylic polymer | Julimar AC-10NPD | Toagosei Co., Ltd. | Sodium polyacrylate, 40% viscosity of 100 to 300 |
| | Polyvinyl alcohol | Kuraray Poval 95-88 | Kuraray Co., Ltd. | Partial saponification, saponification degree of 87.0 to 89.0, 4% viscosity of 80.0 to 110.0 |
| | Hydroxypropyl methyl cellulose | Metolose 60SH-4000 | Shin-Etsu Chemical Co., Ltd. | Substitution degree of methoxy group of 1.9, number of moles of substituted hydroxypropoxy group of 0.25, 2% viscosity of 4,000 |
| | Hydroxyethyl cellulose | HEC Daicel SP900 | Daicel FineChem Ltd. | 1% viscosity of 4,000 to 5,500 |
| | Hydroxyethyl methyl cellulose | Metolose SEB-4000 | Shin-Etsu Chemical Co., Ltd. | Substitution degree of methoxy group of 1.5, number of moles of substituted hydroxyethoxy group of 0.20, 2% viscosity of 4,000 |
| | Methyl cellulose | Metolose SM-4000 | Shin-Etsu Chemical Co., Ltd. | Substitution degree of methoxy group of 1.8, 2% viscosity of 4,000 |
| Component (B) | Ca-laurate | CS-3 | Nitto Chemical Industry | |
| | Ca-stearate | Calcium stearate | Taihei Chemical Industrial Co., Ltd. | |
| | Ca-oleate | Calcium oleate | Kanto Chemical Co., Inc. | |
| | Ca-behenate | CS-7 | Nitto Chemical Industry | |
| | Li-laurate | LS-3 | Nitto Chemical Industry | |
| | Li-stearate | LI-St | Nitto Chemical Industry | |
| | Zn-laurate | Zn-3 | Nitto Chemical Industry | |
| | Zn-stearate | Zn-St | Nitto Chemical Industry | |
| | Mg-laurate | Magnesium laurate | Taihei Chemical Industrial Co., Ltd. | |
| | Mg-stearate | Mg-St | Nitto Chemical Industry | |
| | Al-laurate | Aluminum laurate | Kanto Chemical Co., Inc. | |
| | Al-stearate | Al-St (102) | Nitto Chemical Industry | |
| Component (C) | Coconut alcohol EO adduct | LEOX ®CC-150 | Lion Specialty Chemicals Co., Ltd. | Coconut alcohol EO 15-mol adduct |
| | Na-alpha-olefin sulfonate | LIPOLAN ® LB-840 | Lion Specialty Chemicals Co., Ltd. | Sodium α-olefin sulfonate |

TABLE 1-continued

| Component | Component | Product name | Manufacturer | Remarks (Units for viscosity are all "mPa · s") |
|---|---|---|---|---|
| Component (D) | Gellan gum | Kelcogel | Sumitomo Pharma Food & Chemical Co., Ltd. | TI value = 6.4 |
| | Xanthan gum | Keldent | Sumitomo Pharma Food & Chemical Co., Ltd. | TI value = 4.9 |
| | Diutan gum | Kelco-Care ™ diutan gum | Lubrizol | TI value = 7.8 |
| Others | Preservative | Slaoff EX | Osaka Gas Chemicals Co., Ltd. | BIT-based preservative |

[Production and Performance Evaluation of Water-Diluted Liquid Antiadhesive Composition Solution for Unvulcanized Rubber]

Each liquid antiadhesive composition for unvulcanized rubber of each of the examples and comparative examples was diluted 20 times (mass ratio) with water to produce a water-diluted liquid antiadhesive composition solution for unvulcanized rubber (antiadhesive suspension). Anti-adhesion treatment of unvulcanized rubber was performed using this water-diluted liquid antiadhesive composition solution for unvulcanized rubber, and performance such as the anti-adhesion properties, the lubricity, the scattering properties, the stability, the liquid transfer rate (liquid transferability), and the viscosity were evaluated. The anti-adhesion treatment method and the evaluation method for the performances are shown below.

Evaluation (1) Evaluation Rubber

For various evaluations, the following unvulcanized NR rubber was used as evaluation rubber.

(Unvulcanized NR Rubber)

Unvulcanized NR rubber (162.5 parts by mass in total) obtained by formulating, with respect to 100 parts by mass of NR (RSS #3), 10 parts by mass of white carbon (manufactured by Tosoh Silica Corporation, trade name "Nipsil VN-3"), 30 parts by mass of intermediate super abrasion furnace (ISFA) black (manufactured by Tokai Carbon Co., Ltd., trade name "SEAST 6"), 15 parts by mass of JSRAROMA (process oil) (manufactured by Japan Sun Oil Company, Ltd., trade name "Aroma 790", 3 parts by mass of zinc white (manufactured by Hakusui Tech Co., Ltd., 2 types of zinc white), 1 part by mass of stearic acid (manufactured by NOF Corporation, Camellia), 1 part by mass of 6PPD (manufactured by Ouchi Shinko Chemical Industrial Co., Ltd., trade name "Nocrac 6C"), 1 part by mass of CBS (manufactured by Ouchi Shinko Chemical Industrial Co., Ltd., trade name "Nocceler CZ-G"), and 1.5 parts by mass of sulfur (manufactured by Tsurumi Chemical Industry Co., Ltd.) was used.

(2) Evaluation of Anti-Adhesion Properties

The above-described unvulcanized rubber was kneaded with an open roll at a temperature of 80° C. to 120° C. to form a rubber sheet (thickness: 5 to 8 mm, 60 cm×15 cm), and the rubber sheet immediately after being kneaded was immersed in 1 L of a water-diluted liquid antiadhesive composition solution for unvulcanized rubber (antiadhesive suspension, temperature of 40° C.) obtained by diluting each of the liquid antiadhesive compositions for unvulcanized rubber obtained in Examples 1 to 33 and Comparative Examples 1 to 6 20 times with water for about 1 second. Thereafter, each rubber sheet was quickly pulled up vertically, allowed to stand vertically at room temperature, and dried naturally. In this manner, the rubber sheet (unvulcanized rubber) was subjected to anti-adhesion treatment.

The rubber sheet after the anti-adhesion treatment was cut into 6 cm×15 cm, two sheets were superposed on each other to form a stacked test piece, and a load of 1 t/m 2 was applied to the stacked test piece in the vertical direction from one surface and left at 60° C. for 12 hours.

Thereafter, the test piece was returned to room temperature, a 180° peel test was performed using a tensile tester [AGS-500D type, SHIMADZU] to measure the peel resistance (N/cm) at a tensile rate of 300 mm/min. The smaller the peel resistance, the better the anti-adhesion properties.

(3) Evaluation of Lubricity

Each rubber sheet (unvulcanized rubber) was subjected to anti-adhesion treatment in the same manner as in (2) Evaluation of anti-adhesion properties above. Next, the dried unvulcanized rubber sheet after the anti-adhesion treatment was cut into a rectangle of 5×15 cm. This rubber was placed on a stainless steel plate, the plate was gradually inclined, and the inclination angle when the rubber slipped and fell was measured. The lower the slip-out angle, the better the lubricity.

(4) Evaluation of Scattering Properties

Each rubber sheet (unvulcanized rubber) was subjected to anti-adhesion treatment in the same manner as in (2) Evaluation of anti-adhesion properties above. Next, the dried unvulcanized rubber sheet after the anti-adhesion treatment was cut into a rectangle of 6×15 cm, and the weight was measured. The front and rear surfaces of this rubber were swept with a brush 10 times, and then, the weight was measured again to calculate the scattering amount. The smaller the scattering amount, the better the scattering properties.

(5) Evaluation of Stability 100 mL of each liquid antiadhesive composition for unvulcanized rubber before being diluted 20 times (mass ratio) with water was placed in an airtight container, allowed to stand in a constant-temperature tank at 20° C., and the appearance of the composition after the composition was allowed to stand for 1 week was visually observed to confirm the presence or absence of separation. The stability is good if no separation of the antiadhesive composition for rubber can be visually confirmed.

(6) Evaluation of Liquid Transfer Rate (Liquid Transferability)

100 kg of each liquid antiadhesive composition for unvulcanized rubber before being diluted 20 times (mass ratio) with water was transferred to a height of 3 m through a 20 mm diameter, 7 m long vinyl chloride pipe using a diaphragm pump (manufactured by Anest Iwata Corporation, product name "DDP-120B", liquid transfer rate of 30 L/minute) at 20° C. The liquid transfer rate was calculated from the weight of the transferred liquid antiadhesive composition for unvulcanized rubber and the time required for the transfer. The higher the liquid transfer rate, the better the fluidity.

(7) Evaluation of Viscosity

The viscosity of each liquid antiadhesive composition for unvulcanized rubber before being diluted 20 times (mass ratio) with water was measured 3 days after the production. A BH-type viscometer (Tokimec, trade name "viscometer type BIT") was used to measure the viscosity at 25° C. and 20 rpm after 10 rotations.

For the raw materials of the liquid antiadhesive compositions for unvulcanized rubber of Examples 1 to 33 and Comparative Examples 1 to 6, the types, the compositions, and the 5 evaluation results of each of the performances, such as anti-adhesion properties, lubricity, scattering properties, stability, a liquid transfer rate, and viscosity, evaluated as described above are summarized in Tables 2 to 5 below. In Tables 2 to 5 below, the numerical values indicating the amount of each raw material (containing water) used is a content (mass %) with respect to the total mass (containing water) of each liquid antiadhesive composition for unvulcanized rubber.

TABLE 2

| Component | Raw material | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Component (A) | Carboxymethyl cellulose | | | | 4 | | | | | | |
| | Water-soluble acrylic polymer | | | | | 4 | | | | | |
| | Polyvinyl alcohol | | | | | | 4 | | | | |
| | Hydroxypropyl methyl cellulose | 4 | 4 | 4 | | | | | | | 4 |
| | Hydroxyethyl cellulose | | | | | | | 4 | | | |
| | Hydroxyethyl methyl cellulose | | | | | | | | 4 | | |
| | Methyl cellulose | | | | | | | | | 4 | |
| Component (B) | Ca-laurate | 4 | 4 | 4 | 4 | 4 | 4 | 4 | 4 | 4 | |
| | Ca-palmitate | | | | | | | | | | 4 |
| | Ca-stearate | | | | | | | | | | |
| | Ca-oleate | | | | | | | | | | |
| | Ca-behenate | | | | | | | | | | |
| | Li-laurate | | | | | | | | | | |
| | Li-stearate | | | | | | | | | | |
| | Zn-laurate | | | | | | | | | | |
| | Zn-stearate | | | | | | | | | | |
| | Mg-laurate | | | | | | | | | | |
| | Mg-stearate | | | | | | | | | | |
| | Al-laurate | | | | | | | | | | |
| | Al-stearate | | | | | | | | | | |
| Component (C) | Coconut alcohol EO adduct | 1 | 1 | 1 | 1 | 1 | 1 | 1 | 1 | 1 | 1 |
| | Na-alpha-olefin sulfonate | 0.5 | 0.5 | 0.5 | 0.5 | 0.5 | 0.5 | 0.5 | 0.5 | 0.5 | 0.5 |
| Component (D) | Gellan gum | 0.05 | | | | | | | | | |
| | Xanthan gum | | 0.05 | | 0.05 | 0.05 | 0.05 | 0.05 | 0.05 | 0.05 | 0.05 |
| | Diutan gum | | | 0.05 | | | | | | | |
| Others | Preservative | 0.1 | 0.1 | 0.1 | 0.1 | 0.1 | 0.1 | 0.1 | 0.1 | 0.1 | 0.1 |
| | Water | 90.35 | 90.35 | 90.35 | 90.35 | 90.35 | 90.35 | 90.35 | 90.35 | 90.35 | 90.35 |
| Content with respect to total mass of component other than water (mass %) | Component (A) | 41.5 | 41.5 | 41.5 | 41.5 | 41.5 | 41.5 | 41.5 | 41.5 | 41.5 | 41.5 |
| | Component (B) | 41.5 | 41.5 | 41.5 | 41.5 | 41.5 | 41.5 | 41.5 | 41.5 | 41.5 | 41.5 |
| | Component (C) | 15.5 | 15.5 | 15.5 | 15.5 | 15.5 | 15.5 | 15.5 | 15.5 | 15.5 | 15.5 |
| | Component (D) | 0.5 | 0.5 | 0.5 | 0.5 | 0.5 | 0.5 | 0.5 | 0.5 | 0.5 | 0.5 |
| Mass ratio | mass ratio (A)/(D) | 80 | 80 | 80 | 80 | 80 | 80 | 80 | 80 | 80 | 80 |
| | mass ratio (A)/(B) | 1 | 1 | 1 | 1 | 1 | 1 | 1 | 1 | 1 | 1 |
| | Anti-adhesion properties (N/cm) NR | 0.7 | 0.7 | 0.7 | 1.5 | 1.5 | 1.3 | 1.1 | 0.7 | 0.7 | 0.5 |
| | Lubricity (degree) | 60 | 60 | 60 | 60 | 60 | 60 | 60 | 60 | 60 | 60 |

TABLE 2-continued

| Component | Raw material | Example 1 | Example 2 | Example 3 | Example 4 | Example 5 | Example 6 | Example 7 | Example 8 | Example 9 | Example 10 |
|---|---|---|---|---|---|---|---|---|---|---|---|
| | Scattering properties (mg/100 cm$^2$) | 0.3 | 0.3 | 0.3 | 0.3 | 0.3 | 0.3 | 0.3 | 0.3 | 0.3 | 0.3 |
| | Stability (lw) | ○ | ○ | ○ | ○ | ○ | ○ | ○ | ○ | ○ | ○ |
| | Liquid transfer rate at 20° C. (L/min) | 23 | 23 | 23 | 22 | 23 | 23 | 23 | 23 | 23 | 23 |
| | Viscosity at 20 rpm (mPa · s) | 15,000 | 15,000 | 15,000 | 15,000 | 15,000 | 15,000 | 15,000 | 15,000 | 15,000 | 15,000 |

TABLE 3

| Component | Raw material | Example 11 | Example 12 | Example 13 | Example 14 | Example 15 | Example 16 | Example 17 | Example 18 | Example 19 | Example 20 |
|---|---|---|---|---|---|---|---|---|---|---|---|
| Component (A) | Carboxymethyl cellulose | | | | | | | | | | |
| | Water-soluble acrylic polymer | | | | | | | | | | |
| | Polyvinyl alcohol | | | | | | | | | | |
| | Hydroxypropyl methyl cellulose | 4 | 4 | 4 | 4 | 4 | 4 | 4 | 4 | 4 | 4 |
| | Hydroxyethyl cellulose | | | | | | | | | | |
| | Hydroxyethyl methyl cellulose | | | | | | | | | | |
| | Methyl cellulose | | | | | | | | | | |
| Component (B) | Ca-laurate | | | | | | | | | | |
| | Ca-palmitate | | | | | | | | | | |
| | Ca-stearate | 4 | | | | | | | | | |
| | Ca-oleate | | 4 | | | | | | | | |
| | Ca-behenate | | | 4 | | | | | | | |
| | Li-laurate | | | | 4 | | | | | | |
| | Li-stearate | | | | | 4 | | | | | |
| | Zn-laurate | | | | | | 4 | | | | |
| | Zn-stearate | | | | | | | 4 | | | |
| | Mg-laurate | | | | | | | | 4 | | |
| | Mg-stearate | | | | | | | | | 4 | |
| | Al-laurate | | | | | | | | | | 4 |
| | Al-stearate | | | | | | | | | | |
| Component (C) | Coconut alcohol EO adduct | 1 | 1 | 1 | 1 | 1 | 1 | 1 | 1 | 1 | 1 |
| | Na-alpha-olefin sulfonate | 0.5 | 0.5 | 0.5 | 0.5 | 0.5 | 0.5 | 0.5 | 0.5 | 0.5 | 0.5 |
| Component (D) | Gellan gum | | | | | | | | | | |
| | Xanthan gum | 0.05 | 0.05 | 0.05 | 0.05 | 0.05 | 0.05 | 0.05 | 0.05 | 0.05 | 0.05 |
| | Diutan gum | | | | | | | | | | |
| Others | Preservative | 0.1 | 0.1 | 0.1 | 0.1 | 0.1 | 0.1 | 0.1 | 0.1 | 0.1 | 0.1 |
| | Water | 90.35 | 90.35 | 90.35 | 90.35 | 90.35 | 90.35 | 90.35 | 90.35 | 90.35 | 90.35 |
| Content with respect to total mass of component other than water (mass %) | Component (A) | 41.5 | 41.5 | 41.5 | 41.5 | 41.5 | 41.5 | 41.5 | 41.5 | 41.5 | 41.5 |
| | Component (B) | 41.5 | 41.5 | 41.5 | 41.5 | 41.5 | 41.5 | 41.5 | 41.5 | 41.5 | 41.5 |
| | Component (C) | 15.5 | 15.5 | 15.5 | 15.5 | 15.5 | 15.5 | 15.5 | 15.5 | 15.5 | 15.5 |
| | Component (D) | 0.5 | 0.5 | 0.5 | 0.5 | 0.5 | 0.5 | 0.5 | 0.5 | 0.5 | 0.5 |
| Mass ratio | mass ratio (A)/(D) | 80 | 80 | 80 | 80 | 80 | 80 | 80 | 80 | 80 | 80 |
| | mass ratio (A)/(B) | 1 | 1 | 1 | 1 | 1 | 1 | 1 | 1 | 1 | 1 |

TABLE 3-continued

| Component | Raw material | Example 11 | Example 12 | Example 13 | Example 14 | Example 15 | Example 16 | Example 17 | Example 18 | Example 19 | Example 20 |
|---|---|---|---|---|---|---|---|---|---|---|---|
| | Anti-adhesion properties (N/cm) NR | 0.3 | 0.5 | 0.3 | 0.8 | 0.6 | 0.6 | 0.6 | 0.6 | 0.6 | 0.7 |
| | Lubricity (degree) | 60 | 60 | 60 | 60 | 60 | 60 | 60 | 60 | 60 | 60 |
| | Scattering properties (mg/100 $cm^2$) | 0.2 | 0.2 | 0.3 | 0.3 | 0.2 | 0.3 | 0.2 | 0.3 | 0.2 | 0.3 |
| | Stability (lw) | ○ | ○ | ○ | ○ | ○ | ○ | ○ | ○ | ○ | ○ |
| | Liquid transfer rate at 20° C. (L/min) | 23 | 23 | 23 | 22 | 23 | 23 | 23 | 23 | 23 | 23 |
| | Viscosity at 20 rpm (mPa · s) | 15,000 | 15,000 | 15,000 | 15,000 | 10,000 | 10,000 | 10,000 | 15,000 | 13,000 | 14,000 |

TABLE 4

| Component | Raw material | Example 21 | Example 22 | Example 23 | Example 24 | Example 25 | Example 26 | Example 27 | Example 28 | Example 29 | Example 30 |
|---|---|---|---|---|---|---|---|---|---|---|---|
| Component (A) | Carboxymethyl cellulose | | | | | | | | | | |
| | Water-soluble acrylic polymer | | | | | | | | | | |
| | Polyvinyl alcohol | | | | | | | | | | |
| | Hydroxypropyl methyl cellulose | 4 | 4 | 4 | 4 | 2 | 6 | 6 | 6 | 4 | 3 |
| | Hydroxyethyl cellulose | | | | | | | | | | |
| | Hydroxyethyl methyl cellulose | | | | | | | | | | |
| | Methyl cellulose | | | | | | | | | | |
| Component (B) | Ca-laurate | | 4 | 4 | 4 | 5.3 | 2 | 2 | 2 | 4 | 2 |
| | Ca-palmitate | | | | | | | | | | |
| | Ca-stearate | | | | | | | | | | |
| | Ca-oleate | | | | | | | | | | |
| | Ca-behenate | | | | | | | | | | |
| | Li-laurate | | | | | | | | | | |
| | Li-stearate | | | | | | | | | | |
| | Zn-laurate | | | | | | | | | | |
| | Zn-stearate | | | | | | | | | | |
| | Mg-laurate | | | | | | | | | | |
| | Mg-stearate | | | | | | | | | | |
| | Al-laurate | | | | | | | | | | |
| | Al-stearate | 4 | | | | | | | | | |
| Component (C) | Coconut alcohol EO adduct | 1 | 1 | 1 | 1 | 1 | 1 | 1 | 1 | 1 | 1 |
| | Na-alpha-olefin sulfonate | 0.5 | 0.5 | 0.5 | 0.5 | 0.5 | 0.5 | 0.5 | 0.5 | 0.5 | 0.5 |
| Component (D) | Gellan gum | | | 0.6 | | | | 0.05 | | | |
| | Xanthan gum | 0.05 | 0.6 | | | 0.05 | 0.05 | | | 0.01 | 0.3 |
| | Diutan gum | | | | 0.6 | | | | 0.05 | | 0.3 |
| Others | Preservative | 0.1 | 0.1 | 0.1 | 0.1 | 0.1 | 0.1 | 0.1 | 0.1 | 0.1 | 0.1 |
| | Water | 90.35 | 89.80 | 89.80 | 89.80 | 91.05 | 90.35 | 90.35 | 90.35 | 90.39 | 92.80 |
| Content with respect to total mass of component other than water (mass %) | Component (A) | 41.5 | 39.2 | 39.2 | 39.2 | 22.3 | 62.2 | 62.2 | 62.2 | 41.6 | 41.7 |
| | Component (B) | 41.5 | 39.2 | 39.2 | 39.2 | 59.2 | 20.7 | 20.7 | 20.7 | 41.6 | 27.8 |
| | Component (C) | 15.5 | 14.7 | 14.7 | 14.7 | 16.8 | 15.5 | 15.5 | 15.5 | 15.6 | 20.8 |
| | Component (D) | 0.5 | 5.9 | 5.9 | 5.9 | 0.6 | 0.5 | 0.5 | 0.5 | 0.1 | 8.3 |

TABLE 4-continued

| Component | Raw material | Example 21 | Example 22 | Example 23 | Example 24 | Example 25 | Example 26 | Example 27 | Example 28 | Example 29 | Example 30 |
|---|---|---|---|---|---|---|---|---|---|---|---|
| Mass ratio | mass ratio (A)/(D) | 80 | 6.67 | 6.67 | 6.67 | 40 | 120 | 120 | 120 | 400 | 5 |
| | mass ratio (A)/(B) | 1 | 1 | 1 | 1 | 0.38 | 3 | 3 | 3 | 1 | 1.5 |
| | Anti-adhesion properties (N/cm) NR | 0.7 | 0.2 | 0.2 | 0.2 | 0.9 | 0.9 | 0.7 | 0.7 | 0.7 | 1.0 |
| | Lubricity (degree) | 60 | 60 | 60 | 60 | 50 | 75 | 75 | 75 | 60 | 75 |
| | Scattering properties (mg/100 $cm^2$) | 0.2 | 0.3 | 0.3 | 0.3 | 0.5 | 0.1 | 0.1 | 0.1 | 0.3 | 0.1 |
| | Stability (lw) | ○ | ○ | ○ | ○ | ○ | ○ | ○ | ○ | ○ | ○ |
| | Liquid transfer rate at 20° C. (L/min) | 23 | 22 | 21 | 21 | 25 | 21 | 21 | 20 | 23 | 22 |
| | Viscosity at 20 rpm (mPa · s) | 14,000 | 23,000 | 24,000 | 24,500 | 13,000 | 19,000 | 19,500 | 20,000 | 13,000 | 14,000 |

TABLE 5

| Component | Raw material | Example 31 | Example 32 | Example 33 | Comparative Example 1 | Comparative Example 2 | Comparative Example 3 | Comparative Example 4 | Comparative Example 5 | Comparative Example 6 |
|---|---|---|---|---|---|---|---|---|---|---|
| Component (A) | Carboxymethyl cellulose | | | | | | | | | |
| | Water-soluble acrylic polymer | | | | | | | | | |
| | Polyvinyl alcohol | | | | | | | | | |
| | Hydroxypropyl methyl cellulose | 3 | 3 | 2 | | 7 | 4 | 4 | 4 | 4 |
| | Hydroxyethyl cellulose | | | | | | | | | |
| | Hydroxyethyl methyl cellulose | | | | | | | | | |
| | Methyl cellulose | | | | | | | | | |
| Component (B) | Ca-laurate | 2 | 2 | 5 | 7 | | 4 | 4 | 4 | 4 |
| | Ca-palmitate | | | | | | | | | |
| | Ca-stearate | | | | | | | | | |
| | Ca-oleate | | | | | | | | | |
| | Ca-behenate | | | | | | | | | |
| | Li-laurate | | | | | | | | | |
| | Li-stearate | | | | | | | | | |
| | Zn-laurate | | | | | | | | | |
| | Zn-stearate | | | | | | | | | |
| | Mg-laurate | | | | | | | | | |
| | Mg-stearate | | | | | | | | | |
| | Al-laurate | | | | | | | | | |
| | Al-stearate | | | | | | | | | |
| Component (C) | Coconut alcohol EO adduct | 1 | 1 | 1 | 1 | 1 | 1 | 1 | 1 | |
| | Na-alpha-olefin sulfonate | 0.5 | 0.5 | 0.5 | 0.5 | 0.5 | 0.5 | 0.5 | 0.5 | |
| Component (D) | Gellan gum | 0.3 | 0.3 | | | | | | | |
| | Xanthan gum | 0.3 | | 0.01 | 0.05 | 0.1 | 4 | 0.005 | | 0.05 |
| | Diutan gum | | 0.3 | | | | | | | |
| Others | Preservative | 0.1 | 0.1 | 0.1 | 0.1 | 0.1 | 0.1 | 0.1 | 0.1 | 0.1 |
| | Water | 92.80 | 92.80 | 91.39 | 91.35 | 91.30 | 86.40 | 90.40 | 90.40 | 91.85 |

TABLE 5-continued

| Component | Raw material | Example 31 | Example 32 | Example 33 | Comparative Example 1 | Comparative Example 2 | Comparative Example 3 | Comparative Example 4 | Comparative Example 5 | Comparative Example 6 |
|---|---|---|---|---|---|---|---|---|---|---|
| Content with respect to total mass of component other than water (mass %) | Component (A) | 41.7 | 41.7 | 23.2 | 0.0 | 80.5 | 29.4 | 41.6 | 41.7 | 49.1 |
| | Component (B) | 27.8 | 27.8 | 58.1 | 80.9 | 0.0 | 29.4 | 41.6 | 41.7 | 49.1 |
| | Component (C) | 20.8 | 20.8 | 17.4 | 17.3 | 17.2 | 11.0 | 15.6 | 15.6 | 0.0 |
| | Component (D) | 8.3 | 8.3 | 0.1 | 0.6 | 1.1 | 29.4 | 0.1 | 0.0 | 0.6 |
| Mass ratio | mass ratio (A)/(D) | 5 | 5 | 200 | 0 | 70 | 1.00 | 800 | 0 | 80 |
| | mass ratio (A)/(B) | 1.5 | 1.5 | 0.4 | 0 | — | 1 | 1 | 1 | 1 |
| | Anti-adhesion properties (N/cm) NR | 1.0 | 1.0 | 0.9 | 4.0 | 1.0 | 0.7 | 0.7 | 0.7 | 2.3 |
| | Lubricity (degree) | 75 | 75 | 55 | 50 | 90 | 60 | 60 | 60 | 60 |
| | Scattering properties (mg/100 $cm^2$) | 0.1 | 0.1 | 0.4 | 0.8 | 0 | 0.2 | 0.2 | 0.2 | 0.2 |
| | Stability (lw) | ○ | ○ | ○ | ○ | ○ | ○ | x | x | x |
| | Liquid transfer rate at 20° C. (L/min) | 22 | 22 | 25 | 25 | 16 | 13 | 23 | 23 | 23 |
| | Viscosity at 20 rpm (mPa · s) | 14,000 | 15,000 | 9,000 | 7,000 | 25,000 | 70,000 | 12,000 | 12,000 | 12,000 |

As shown in Tables 2 to 5 above, all of the liquid antiadhesive compositions for unvulcanized rubber of Examples 1 to 33 had favorable anti-adhesion properties, lubricity, scattering properties, stability, and liquid transferability (viscosity). On the other hand, the liquid antiadhesive composition for unvulcanized rubber of Comparative Example 1 in which the component (A) was not used had favorable lubricity, scattering properties, stability, and liquid transferability, but had significantly inferior anti-adhesion properties compared to the examples. The liquid antiadhesive composition for unvulcanized rubber of Comparative Example 2 in which the component (B) was not used had favorable anti-adhesion properties, scattering properties, and stability, but had inferior lubricity and liquid transferability compared to the examples. The liquid antiadhesive composition for unvulcanized rubber of Comparative Example 3 in which the mass ratio (A)/(D) was less than 5 had favorable anti-adhesion properties, lubricity, scattering properties, and stability, but had significantly inferior liquid transferability compared to the examples. The liquid antiadhesive composition for unvulcanized rubber of Comparative Example 4 in which the mass ratio (A)/(D) was greater than 500 had favorable anti-adhesion properties, lubricity, scattering properties, and liquid transferability, but had inferior stability compared to the examples. The liquid antiadhesive composition for unvulcanized rubber of Comparative Example 5 in which the component (D) was not used had favorable anti-adhesion properties, lubricity, scattering properties, and liquid transferability, but had inferior stability compared to the examples. The liquid antiadhesive composition for unvulcanized rubber of Comparative Example 6 in which the component (C) was not used had favorable lubricity, scattering properties, and liquid transferability, but had inferior anti-adhesion properties and stability compared to the examples.

ADDITIONAL NOTES

Some or all of the above-described embodiment and the examples can also be described as the following additional notes, but are not limited to the following.

Additional Note 1

A liquid antiadhesive composition for unvulcanized rubber including: components (A) to (D) below; and water, in which a mass ratio (A)/(D) of the following component (A) to the following component (D) is 5 to 500.

(A): Water-soluble polymer other than component (D)

(B): Metal soap (C): Surfactant (D): One or more kinds of compounds selected from water-soluble polymers in which thixotropic index (2 rpm/20 rpm) of 2 mass % aqueous solution at 20° C. is 4.0 or more

Additional Note 2

The liquid antiadhesive composition for unvulcanized rubber according to additional note 1, which contains 20 mass % or more of the component (A), 20 to 60 mass % of the component (B), 10 to 25 mass % of the component (C), and 0.01 to 10 mass % of the component (D) based on 100 mass % of all the components other than water.

Additional Note 3

The liquid antiadhesive composition for unvulcanized rubber according to additional notes 1 or 2, in which a mass ratio (A)/(B) of the component (A) to the component (B) is within a range of 0.2 to 4.0.

Additional Note 4

A water-diluted liquid antiadhesive composition solution for unvulcanized rubber, including: the liquid antiadhesive composition for unvulcanized rubber according to any one of additional notes 1 to 3; and water.

Additional Note 5

Unvulcanized rubber including: the components (A) to (D) of the liquid antiadhesive composition for unvulcanized rubber according to any one of additional notes 1 to 3 adhering to its surface.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A liquid antiadhesive composition for unvulcanized rubber comprising:

components (A) to (D) below; and water, wherein a mass ratio (A)/(D) of the following component (A) to the following component (D) is 5 to 500, wherein the component (A) is a water-soluble polymer other than the component (D), wherein the component (B) is a metal soap, wherein the component (C) is a surfactant, and wherein the component (D) is one or more kinds of compounds selected from water-soluble polymers in which a thixotropic index of a 2 mass % aqueous solution at 20° C., determined by a ratio of a viscosity value obtained at 2 rpm to a viscosity value obtained at 20 rpm, is 4.0 or more, the component (D) is at least one selected from the group consisting of diutan gum, xanthan gum, guar gum, locust bean gum, and gellan gum.

2. The liquid antiadhesive composition for unvulcanized rubber according to claim 1, which contains 20 mass % or more of the component (A), 20 to 60 mass % of the component (B), 10 to 25 mass % of the component (C), and 0.01 to 10 mass % of the component (D) based on 100 mass % of all the components other than water.

3. The liquid antiadhesive composition for unvulcanized rubber according to claim 1, wherein a mass ratio (A)/(B) of the component (A) to the component (B) is within a range of 0.2 to 4.0.

4. The liquid antiadhesive composition for unvulcanized rubber according to claim 2, wherein a mass ratio (A)/(B) of the component (A) to the component (B) is within a range of 0.2 to 4.0.

5. A water-diluted liquid antiadhesive composition solution for unvulcanized rubber, comprising:

the liquid antiadhesive composition for unvulcanized rubber according to claim 1; and water.

6. A water-diluted liquid antiadhesive composition solution for unvulcanized rubber, comprising:

the liquid antiadhesive composition for unvulcanized rubber according to claim 2; and water.

7. Unvulcanized rubber comprising:

the components (A) to (D) of the liquid antiadhesive composition for unvulcanized rubber according to claim 1 adhering to its surface.

8. Unvulcanized rubber comprising:

the components (A) to (D) of the liquid antiadhesive composition for unvulcanized rubber according to claim 2 adhering to its surface.

* * * * *